Sept. 26, 1933.   G. F. ENDICOTT   1,928,011
HAND BRAKE
Filed March 31, 1930
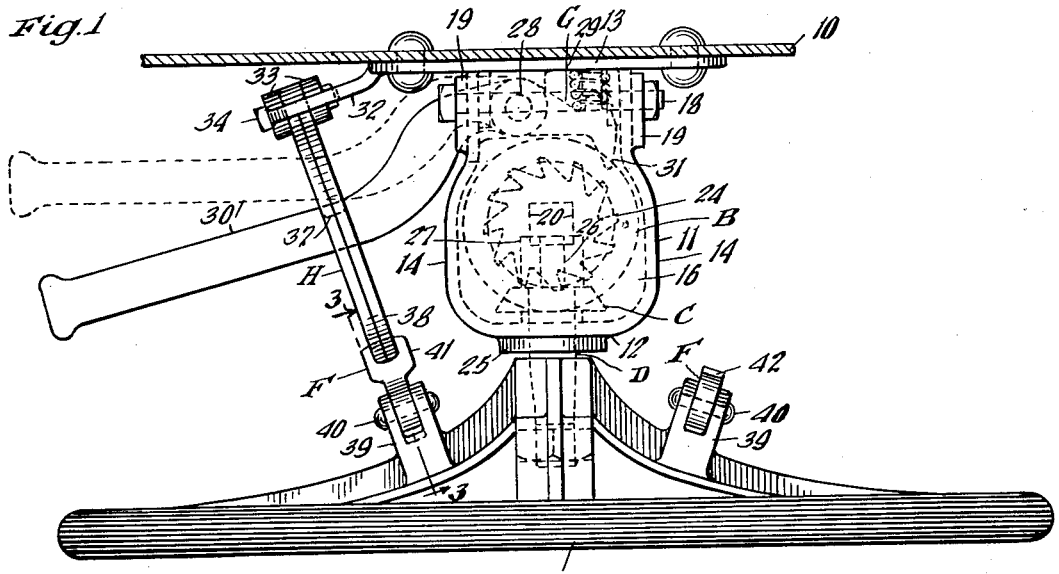
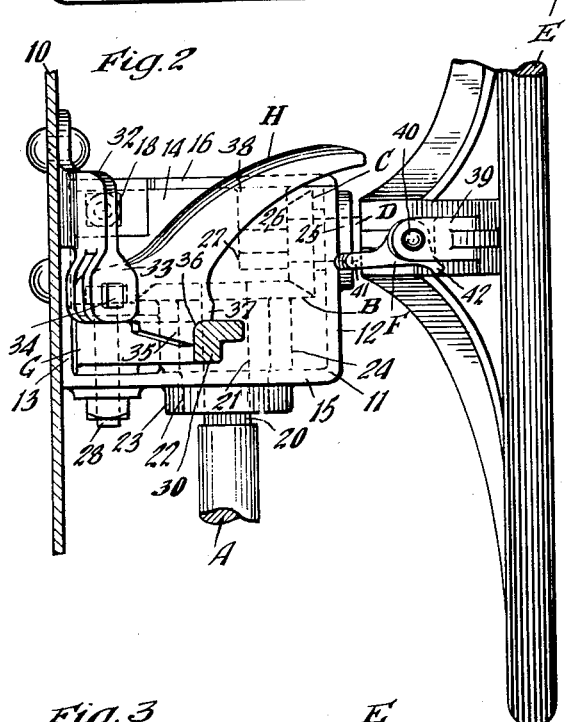
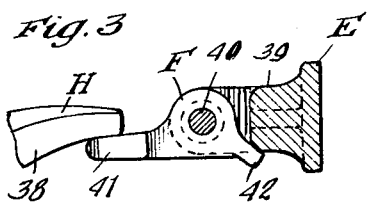
Inventor
George F. Endicott
Witness
Wm. Geiger
By Joseph Harris
His Atty.

Patented Sept. 26, 1933

1,928,011

UNITED STATES PATENT OFFICE 1,928,011

HAND BRAKE

George F. Endicott, St. Paul, Minn., assignor to W. H. Miner, Inc., Chicago, Ill., a corporation of Delaware Application March 31, 1930. Serial No. 440,268

6 Claims. (Cl. 188—81.1)

This invention relates to improvements in hand brakes.

In the operation of hand brakes of that type including a chain winding drum and a locking dog for preventing retrograde rotation of the winding drum, wherein the dog is manually disengaged from the winding mechanism to release the brakes and is held in such disengaged position by latch means, it frequently occurs that the operator neglects to disengage the latching means before again applying the brakes, with the result that the dog will not operate and the brakes will not be held against retrograde movement and further will not be locked in tightened condition. It is the main object of my invention to overcome the defects pointed out by providing means operated through the mechanism for tightening the brakes for automatically disengaging the latch means so as to render the dog operative to hold the winding means against retrograde rotation.

A further object of the invention is to provide a hand brake mechanism for railway cars including a chain winding staff actuated by a rotary hand wheel together with means for preventing retrograde movement of the staff including a locking dog and cooperating ratchet means on the staff, and a latch member for holding the dog in inoperative position, wherein means is provided actuated through rotation of the hand wheel in a chain winding direction, for automatically disengaging the latch from the dog to free the latter and again render the same operative.

A more specific object of the invention is to provide a hand brake mechanism of the hand wheel actuated type including power multiplying gear means, a rotary chain winding element actuated by the gear means, means for preventing retrograde rotation of the winding element including a pivoted locking dog adapted to be manually disengaged to permit free running of the staff to effect quick release of the brakes, and locking means for holding said dog disengaged, wherein the hand wheel is provided with means operative for tripping the latch when the hand wheel is rotated in a chain winding direction to thereby release the dog to again render the same operative to hold the staff against movement in an unwinding direction.

Other objects of the invention will more clearly appear from the description and claims hereinafter following.

In the drawing, forming a part of this specification, Figure 1 is a horizontal, sectional view through the end wall of a railway car illustrating my improved hand brake mechanism as mounted on said end wall and showing the same in plan, certain parts of the mechanism being illustrated in dotted lines. Figure 2 is a vertical, sectional view through the end wall of the car and the operating handle end of the locking dog illustrating the improved hand brake mechanism in side elevation, certain parts of the mechanism being broken away. Figure 3 is a sectional view corresponding substantially to the line 3—3 of Figure 1, illustrating certain details of the latching and tripping mechanism.

In said drawing, 10 designates the end wall of a railway car to which my improved hand brake mechanism is secured. The operating parts of the driving mechanism of my improved hand brake are preferably mounted within a housing, the same being designated generally by the character 11. The housing may be mounted on the end wall of the car in any suitable manner, and as herein shown is secured thereto by means of rivets. The housing is provided with front and rear walls 12 and 13, side walls 14—14 and a bottom wall 15. The back wall 13 of the housing is laterally and vertically extended, as clearly shown in Figure 1, to provide flange portions adapted to receive the securing rivets by which the housing is fixed to the wall 10 of the car. The top of the housing is open, a cover plate 16 being employed to close the same. The cover plate is held in position by a transverse securing bolt 18 extending through the side walls of the housing and depending lugs 19—19 on said cover plate.

My improved hand brake mechanism proper comprises broadly a chain winding staff A; cooperating bevel gears B and C, an operating shaft D, a hand wheel E, pivoted trip members F—F, a spring actuated locking dog G and a latch member H.

The chain winding staff A is of the usual type having a chain winding portion at the bottom end thereof, not shown. At the upper end, the staff A is provided with a reduced portion 20 of substantially square cross section, which fits within an opening 21 of square cross section in the gear member B.

The gear member B, which is mounted on the upper end of the staff A, has a hub portion 22 which is journaled in a bearing member 23 provided on the bottom wall 15 of the housing 11. At the top, the gear member B is provided with a series of bevel gear teeth and immediately below said portion the same is provided with an annular series of ratchet teeth 24, which cooperate with the locking dog G, in a manner hereinafter pointed out.

The hand wheel E is secured to the operating shaft D, which is journaled in a bearing member 25 on the front wall 12 of the housing. The shaft extends through the bearing member 25 and has a bevel gear C secured to the inner end portion thereof, the extremity of the shaft beyond the gear C being reduced in diameter, as indicated at 26, and journaled in a bearing member 27 depending from the cover plate 16. As clearly illustrated in Figures 1 and 2, the gear C meshes with the gear B and is of smaller diameter than the latter, thereby providing multiplication of power in the brake tightening operation.

The locking dog G is mounted on a vertical pivot member 28 suitably fixed to the housing. The dog G has a relatively short inner arm 29 and a longer outer arm 30 which is offset, as shown, and provides an operating handle member for the dog. The arm 29 of the dog is provided with a locking tooth 31 at the extremity thereof which cooperates with the ratchet teeth 24 of the gear member B to prevent backward movement of the staff A, that is, to prevent retrograde rotation thereof. The dog is normally urged into engagement with the ratchet teeth by spring means, of well known type, as shown. In Figure 1, the dog is shown in disengaged position so as to permit free running of the brake staff in release of the brakes. The dog G is manually brought to this position through operation of the handle 30. In order to maintain the dog in disengaged position, the latch H is provided. As clearly shown in Figures 1 and 2, the latch H is pivotally supported on a bracket 32 angularly extending from the plate, forming the rear wall 13 of the housing. The bracket 32 is provided with a depending bifurcated portion 33 between the members of which the latch H is pivotally supported by a transverse pivot pin 34 extending through said members and the latch H. The latch H is provided with a depending portion 35 adapted to engage in back of the offset portion of the arm 30 of the dog G, the portion 35 being notched, as indicated at 36, thereby providing a stop shoulder 37 adapted to engage the top surface of the arm 30 of the dog to limit the downward swinging movement of the latch member. The latch member is also provided with a laterally projecting upstanding elongated arm 38, which exends toward the hand wheel E. The length of the arm 38 is such that it extends into the path of movement of the trip members F—F.

As shown, the trip members F—F are two in number. It will, however, be appreciated that my invention is not limited thereto and that any number of trip members F or a single trip member may be employed, without departing from the invention.

Each trip member F is preferably supported from a spoke of the hand wheel E. As shown, two opposed spokes of the hand wheel E are provided with supporting members 39—39 for the trip members F, the supporting members being preferably cast integral with the spoke members and each being provided with a bifurcated projecting portion between the members of which the corresponding trip member F is pivoted on a transverse pivot pin 40. Each trip member F comprises an elongated finger 41 at one side of the pivot thereof and a relatively short lug 42 at the opposite side of said pivot. Referring to the trip member F, shown at the lefthand side of said Figure 1 and shown in elevation in Figure 2, the lug 42 is of such a length that it engages the supporting member 39 inwardly of the bifurcated portion thereof so as to hold the finger 41 in substantially horizontal position when the hand wheel is in the position illustrated in the drawing. As will be evident, when the hand wheel D is rotated in a righthand direction, that is in chain winding direction, the finger 41 of the trip member F referred to will engage the arm 38 of the locking member H, thereby lifting the same and disengaging the depending portion thereof from the dog G, the trip member F being at this time held against pivotal movement by engagement of the lug 42 with the member 39. This position of the parts is clearly illustrated in Figure 3.

As will be evident, when the hand wheel E is rotated in a lefthand or chain unwinding direction, the trip members F will idle over the projecting arm 38 of the locking member H, due to the trip members F being freely swingable on their pivotal supports in an upward direction, when passing the arm of the locking member H.

As will be evident, when the locking or latch member H is disengaged from the dog G, the dog is free to return to its operative position, the spring which cooperates with the dog urging the tooth 31 toward the ratchet member of the gear B.

In the operation of my improved hand brake mechanism, in tightening the brakes, the hand wheel is rotated in a clockwise direction, as viewed in Figure 1, thereby effecting rotation of the winding staff A through the medium of the gears C and B, also in a clockwise direction. During this operation, the locking dog G will be in yielding engagement with the ratchet member of the gear B, thereby preventing backward rotation of the brake staff A. During the chain winding operation, while the dog G is in operative engagement with the ratchet member, the latch H will be supported on top of the arm 30 of the dog and be inoperative. Assuming that the brakes have been fully tightened and it is desired to effect release thereof, the operator swings the handle portion of the lever arm 30 of the dog outwardly away from the dotted line position shown in Figure 1 to the full line position in said figure. When the handle or arm 30 is brought to the full line position shown in Figure 1, the latch H will engage in back of the offset portion of said arm, as clearly illustrated in Figure 2, thereby locking the dog in disengaged or inoperative position. When it is again desired to apply the brakes, it is merely necessary to rotate the hand wheel E in a chain winding or clockwise direction, as viewed in Figure 1. Rotation of the hand wheel in this direction will bring the projecting fingers 41 of the trip members F into operative engagement with the arm 38 of the latch H, thereby raising the latch and disengaging the same from the dog G permitting the dog to return to operative position in engaging relation with the ratchet of the gear B. As will be clear, a partial rotation only of the hand wheel E is required to effect disengagement of the latch H in that either of the two trip members F—F are operative to actuate the latch. The number of trip members employed may be obviously increased, thereby decreasing the amount of movement of the hand wheel necessary to trip the latch member.

From the preceding description taken in connection with the drawing, it will be evident that I have provided an exceedingly simple and efficient automatic means for rendering the entire brake mechanism operative when the hand wheel is rotated in a direction to tighten the brakes, the operator's attention not being required for the manipulation of any other parts in order to render the locking dog operative to prevent rotation of the chain winding means in an unwinding direction.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding element; of a hand wheel for rotating said element; a movable locking dog for preventing retrograde rotation of said element; movable latching means engageable with the dog for locking the latter in inoperative position; and means rotatable with the hand wheel in a chain winding direction and engageable with said latching means for automatically disengaging said latching means to render said dog operative.

2. In a hand brake mechanism, the combination with a rotary chain winding element; of a manually actuated rotary member for operating said element; a locking dog co-operating with said element for holding the same against rotation in an unwidning direction, said dog being manually disengageable from said element to permit free running of the winding element; a latch member for locking said dog in disengaged position to maintain the same inoperative; and trip means on the hand wheel adapted to automatically trip said latch when the hand wheel is rotated in a winding direction to unlock said dog and to again render the same operative.

3. In a hand brake mechanism, the combination with a rotary chain winding staff; of a hand wheel for rotating said staff; ratchet means on the staff; a pivoted locking dog cooperating with said ratchet means for holding the staff against rotation in an unwinding direction, said dog having an arm by which the same is manipulated to effect disengagement thereof from the ratchet means; a pivoted latch member for automatically locking said dog in disengaged position; and a plurality of tripping lugs on said hand wheel for automatically tripping said latch when the hand wheel is rotated in a direction to wind the chain, to thereby unlock said dog and render the same operative to hold the chain winding element against rotation in a chain unwinding direction.

4. In a hand brake mechanism, the combination with a rotary chain winding staff; of a hand wheel for rotating said staff; ratchet means on the staff; a pivoted locking dog cooperating with said ratchet means for holding the staff against rotation in an unwinding direction, said dog having an arm by which the same is manipulated to effect disengagement thereof from the ratchet means; a pivoted latch member for automatically locking said dog in disengaged position; and trip means on said hand wheel including a pivoted finger adapted to engage the latch member for automatically tripping the same when the hand wheel is rotated in a direction to wind the chain, to thereby unlock said dog and render the same operative.

5. In a hand brake mechanism, the combination with a rotary chain winding staff; of a hand wheel for rotating said staff; ratchet means on the staff; a pivoted locking dog cooperating with said ratchet means for holding the staff against rotation in an unwinding direction, said dog having an arm by which the same is manipulated to effect disengagement thereof from the ratchet means; a pivoted latch member for automatically locking said dog in disengaged position; a pivoted finger adapted to have free swinging movement in one direction to idle over said latch when the hand wheel is rotated in a direction to unwind the chain; and a stop shoulder preventing swinging movement of the latch in a reverse direction when said hand wheel is rotated in a chain winding direction, thereby tripping the latch when engaging the same to unlock said dog and render the same operative.

6. In a hand brake mechanism, the combination with a rotatable chain winding member; of a hand wheel for rotating said member; a spring pressed dog for preventing retrograde movement of the winding member; latch means engageable with the dog for locking the latter in inoperative position to permit free rotation of said member; and means on the hand wheel rotatable therewith and operative during rotation thereof in a chain winding direction to engage and actuate said latch means to unlock the same from said dog.

GEORGE F. ENDICOTT.